United States Patent
Jiang et al.

(10) Patent No.: US 10,975,772 B2
(45) Date of Patent: Apr. 13, 2021

(54) STARTER LOCKING ASSEMBLIES AND METHODS

(71) Applicant: HAMILTON SUNDSTRAND CORPORATION, Charlotte, NC (US)

(72) Inventors: Yiwei Jiang, Rockford, IL (US); James Vandung Nguyen, Rockford, IL (US); Edward W. Goy, Crystal Lake, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 254 days.

(21) Appl. No.: 16/269,956

(22) Filed: Feb. 7, 2019

(65) Prior Publication Data

US 2020/0256256 A1    Aug. 13, 2020

(51) Int. Cl.
| | |
|---|---|
| *F02C 7/27* | (2006.01) |
| *F16H 57/08* | (2006.01) |
| *F02C 7/277* | (2006.01) |
| *F16D 1/076* | (2006.01) |
| *F16D 1/10* | (2006.01) |

(52) U.S. Cl.
CPC .............. *F02C 7/27* (2013.01); *F02C 7/277* (2013.01); *F16D 1/076* (2013.01); *F16D 1/10* (2013.01); *F16H 57/08* (2013.01)

(58) Field of Classification Search
CPC .............. F16D 1/10–12; F16D 7/025; F16D 2001/013; F16D 1/076; F16D 2125/48; F02C 7/277; F02C 7/36; F02C 3/103; F16H 57/0025; F16B 2200/403
USPC ........................................... 744/493; 411/367
See application file for complete search history.

(56) References Cited

U.S. PATENT DOCUMENTS

| | | | | |
|---|---|---|---|---|
| 2,726,524 | A | * | 12/1955 | Gorin .................... F16D 7/025 464/45 |
| 4,142,765 | A | | 3/1979 | Olsaker |
| 4,778,303 | A | * | 10/1988 | Mullins ................. F16D 1/108 403/11 |
| 4,966,474 | A | | 10/1990 | Geiger |
| 5,722,163 | A | | 3/1998 | Grant et al. |
| 6,681,579 | B2 | | 1/2004 | Lane et al. |
| 8,613,142 | B2 | | 12/2013 | Slayter et al. |
| 9,212,556 | B2 | | 12/2015 | Lucas et al. |
| 2003/0099540 | A1 | | 5/2003 | Feest |
| 2011/0308345 | A1 | * | 12/2011 | Makulec ................ F01D 5/026 74/438 |

OTHER PUBLICATIONS

European Search Report for European Application No. 19208654.4 dated Jun. 1, 2020.

* cited by examiner

*Primary Examiner* — Gerald L Sung
*Assistant Examiner* — Rene D Ford
(74) *Attorney, Agent, or Firm* — Carlson, Gaskey & Olds, P.C.

(57) ABSTRACT

A starter for a gas turbine engine includes a rotor shaft rotatable about an axis and includes an inner bore extending from an axial end of the rotor shaft with respect to the axis. A sun gear is on the rotor shaft. A lock nut is received against an axial end face of the sun gear and threadedly engaged with an outer diameter of the rotor shaft. A retainer is positioned to bias the nut against the axial end face and includes a projection portion threadedly engaged with the rotor shaft in the inner bore. A bolt through the projection portion is threadedly engaged with the rotor shaft.

20 Claims, 5 Drawing Sheets

STARTER LOCKING ASSEMBLIES AND METHODS

BACKGROUND

This application relates to locking assemblies that may be utilized in an air turbine starter.

Air turbine starters are known, and include a turbine rotor which receives compressed air from a source to drive the turbine rotor. As the turbine rotor rotates, it rotates a planetary gear system, and ultimately an output shaft. The output shaft is connected to a prime mover, such as a gas turbine engine in an aircraft, and is utilized as a starter to begin rotation of the gas turbine engine core.

The rotor shaft receives a sun gear of the planetary gear system and a bearing assembly. The sun gear and bearing assembly may be clamped to the rotor shaft by a locking assembly.

SUMMARY

A starter for a gas turbine engine, according to an example of the present disclosure, includes a rotor shaft rotatable about an axis and including an inner bore extending from an axial end of the rotor shaft with respect to the axis. A sun gear is received on the rotor shaft. A lock nut is received against an axial end face of the sun gear and threadedly engaged with an outer diameter of the rotor shaft. A retainer is positioned to bias the nut against the axial end face and includes a projection portion threadedly engaged with the rotor shaft in the inner bore. A bolt through the projection portion is threadedly engaged with the rotor shaft.

These and other features may be best understood from the following specification and drawings, the following of which is a brief description.

DETAILED DESCRIPTION

Figure 1:
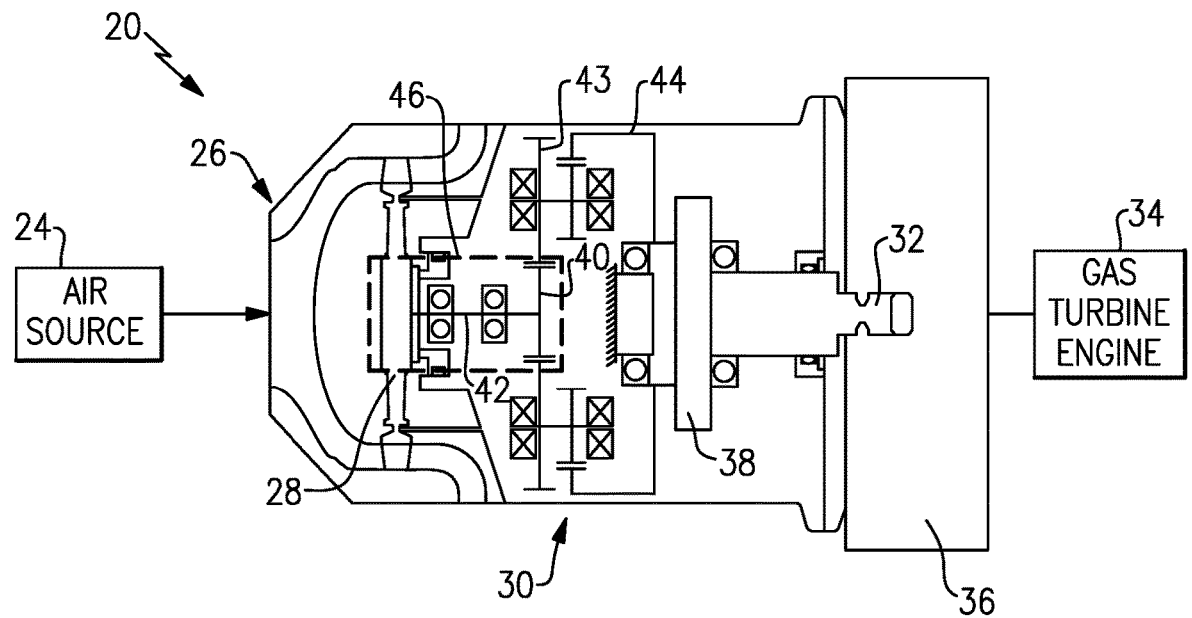
FIG. 1 schematically illustrates a starter for a gas turbine engine.

FIG. 1 schematically illustrates a starter 20 for a gas turbine engine 34. An air source 24 delivers high pressure air into an inlet 26. The high pressure air flows across a turbine rotor 28, causing the turbine rotor 28 to rotate. As the turbine rotor 28 rotates, it rotates a planetary gear system 30, and ultimately the output shaft 32. The output shaft 32 may be utilized as an engine starter in some examples, to start operation of a main gas turbine engine 34. In some examples, as shown, the output shaft 32 drives the gas turbine engine through an accessory gearbox 36. As shown, in some examples, a clutch 38 is provided between the planetary gear system 30 and the output shaft 32.

The planetary gear system 30 includes a sun gear 40 that is driven by a rotor shaft 42 and rotates with the turbine rotor 28. During engine starts, the sun gear 40 drives a plurality of planet gears 43, which drive a ring gear 44. The ring gear 44 drives the output shaft 32 through the clutch 38.

Figure 2:
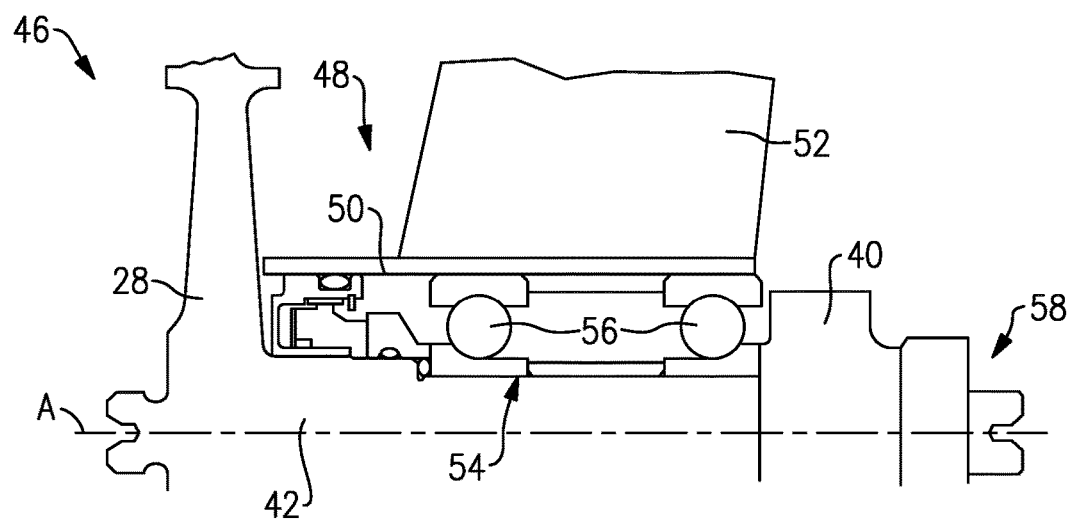
FIG. 2 illustrates a partial section of the starter of FIG. 1.

FIG. 2 illustrates a turbine assembly section 46 of the starter 20 shown in FIG. 1. The turbine rotor 28 is rotatable with the rotor shaft 42 about a centerline axis A. A stator section 48 is provided axially aft (downstream with respect to the working fluid) of the rotor 28. The stator section 48 includes a hub 50 and a gear cage housing 52 radially outward of the hub 50. Alternatively or additionally, the stator section 48 may include other stationary components of the starter 20.

A bearing assembly 54 is provided radially between the rotor shaft 42 and the hub 50 and includes one or more ball bearings 56. The inner races of the ball bearings 56 rotate with the rotor shaft 42, while the outer races of the ball bearings 56 are static and support the hub 50. The sun gear 40 is provided axially aft of the aft-most ball bearing 56. A locking assembly 58 (shown schematically) is provided axially aft of the sun gear 40 to clamp the sun gear 40 and the bearing assembly 54 to the rotor shaft 42 to achieve desired compression and balancing. Prior art locking assemblies 58 may include customized nuts, which may be expensive and require long assembly times, often requiring shims and/or other additional components for installation.

Figure 3:
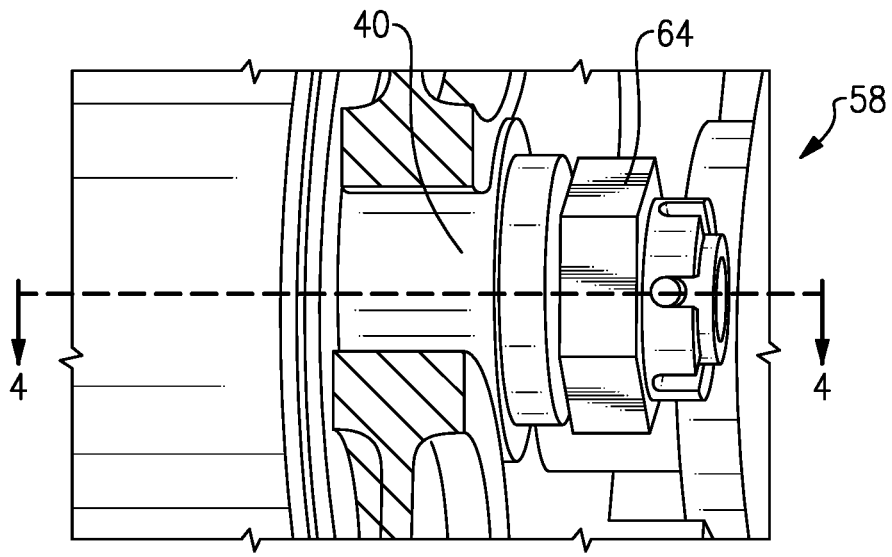
FIG. 3 illustrates a prior art locking assembly.

FIG. 3 illustrates prior art locking assembly including a castellated nut 64 positioned to clamp a sun gear 40.

Figure 4:
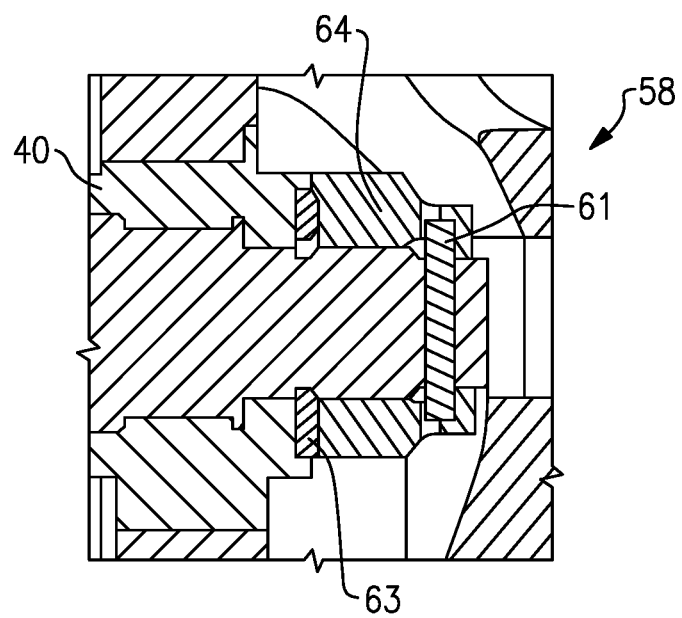
FIG. 4 illustrates a cross sectional view of the locking assembly of FIG. 3.

FIG. 4 illustrates a cross-sectional view of the locking assembly 58 illustrated in FIG. 3. The castellated nut 64 is aligned with openings in the rotor shaft 42, and a pin 61 is placed through the castellated portion (grooves or slots in upper face) of the nut 64 and into openings in the rotor shaft 42. A shim 63 is then placed to fill any gap between the nut 64 and the sun gear 40 to achieve the desired compression. Applicant has identified the drawbacks of the prior art locking assemblies.

In another prior art locking assembly (not shown), a customized nut is fastened to the rotor shaft against the sun gear and receives a ring having geometrical aspect to interface with a corresponding surfaces on the rotor shaft and nut for positive locking of the nut onto the rotor shaft.

Figure 5:
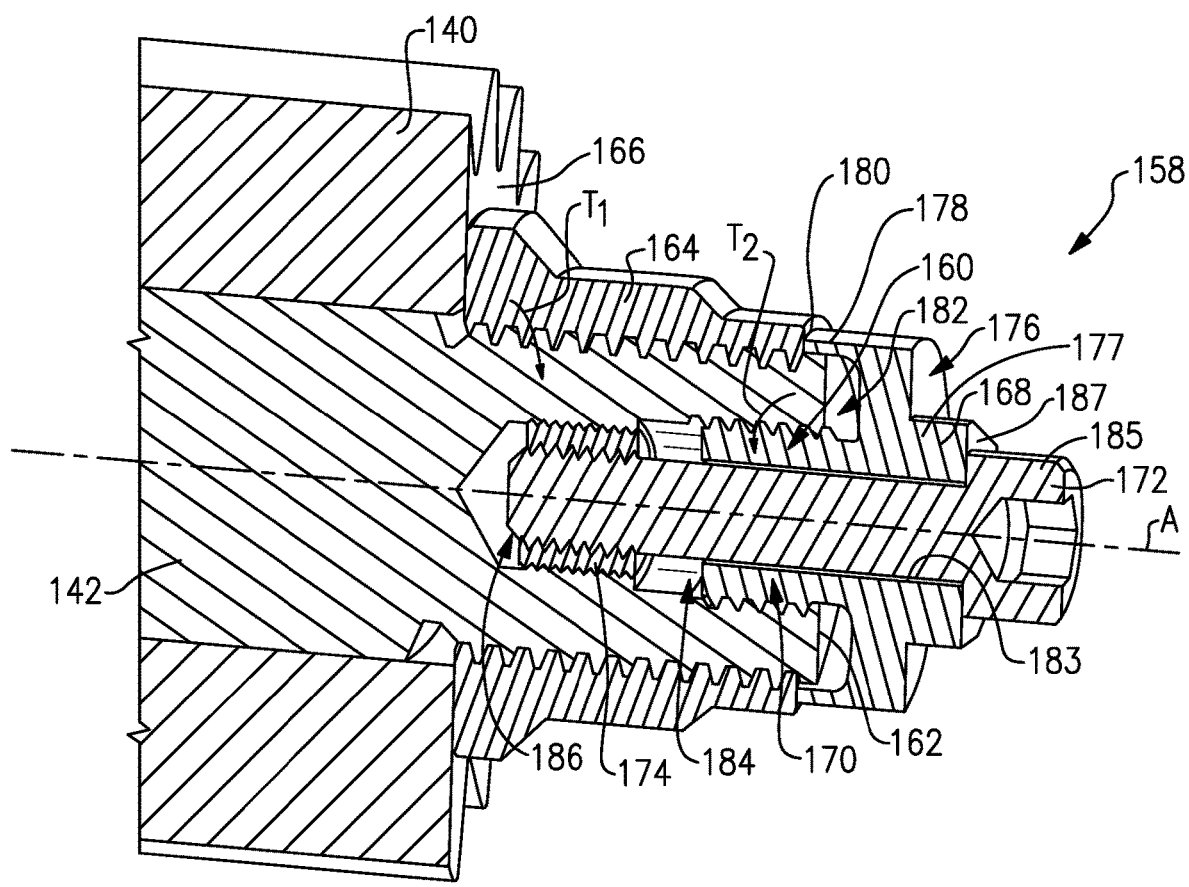
FIG. 5 illustrates an example locking assembly.

FIG. 5 illustrates a locking assembly 158 for clamping the sun gear 140 and bearing assembly (not shown; see FIG. 2) to a rotor shaft 142 of the starter 20 shown in FIGS. 1 and 2 in some examples. It should be understood that like reference numerals identify corresponding or similar elements throughout the several drawings. The rotor shaft 142 includes an inner bore 160 extending from an axial end face 162 of the rotor shaft 142. A lock nut 164 is received against an axial end face 166 of the sun gear 140 for clamping the sun gear 140 to the rotor shaft 142. An inner diameter of the lock nut 164 is threadedly engaged with an outer diameter of the rotor shaft 142. The lock nut 164 may be an off-the-shelf lock nut having a threaded inner diameter for engaging a threaded outer diameter of the rotor shaft 142. Although the starter 20 is used as an example in the disclosure, other rotating machines may benefit from this disclosure.

A retainer 168 is positioned to bias the lock nut 164 against the axial end face 166. The retainer 168 includes a projection portion 170 threadedly engaged with the rotor shaft 142 in the inner bore 160. As shown schematically, in some examples, the nut 164 is threadedly engaged with the rotor shaft 142 in a first threaded direction T1, and the retainer 168 is threadedly engaged with the inner bore 160 in a second threaded direction T2 opposite the first threaded direction T1 for secure locking. For example, the retainer 168 may include left hand threads, and the nut 164 may include right hand threads, and vice versa. A bolt 172 extends axially along the axis A through the projection portion 170 and threadedly engages with the rotor shaft 142. In some examples, as shown, the bolt 172 threadedly engages the shaft 142 through a threaded helicoil insert 174. In other examples, the bolt 172 threadedly engages the rotor shaft 142 directly.

The projection portion 170 may extend from a cap portion 176 that includes a flange 178. The flange 178 abuts an end face 180 of the nut 164 at an interface radially outward of the rotor shaft 142. A groove 182 is provided radially between the flange 178 and the projection portion 170, and the end face 162 of the rotor shaft 142 extends into the groove 182 when the locking assembly 158 is assembled. There may be an axial gap between the face 162 and the retainer 168 in some examples, as shown. An opening 183 of the retainer 168 extends through the cap portion 176 and the projection portion 170 and is centered about the axis A to receive the bolt 172. As shown, in some examples, the cap portion 176 may include a hexagonally shaped portion 177 for engagement with tools for assembling and disassembling. A head 185 of the bolt 172 may be received against an end surface 187 of the cap portion in some examples.

In the example shown, the bore 160 is a counterbore, including a first portion 184 and a second portion 186 spaced inward from the end face 162 from the first portion 184. The first portion 184 has a greater diameter than the second portion 186. In the illustrative example, the projection portion 170 is threadedly engaged with the first portion 184, and the bolt 172 is threadedly engaged with the second portion 186. That is, the counterboring allows both the projection portion 170 and the bolt 172 to threadedly engage the rotor shaft 142. The locking assembly 158 therefore threadedly engages both inner and outer portions of the rotor shaft 142 for secure locking and a balanced rotor shaft 142.

Figure 6:
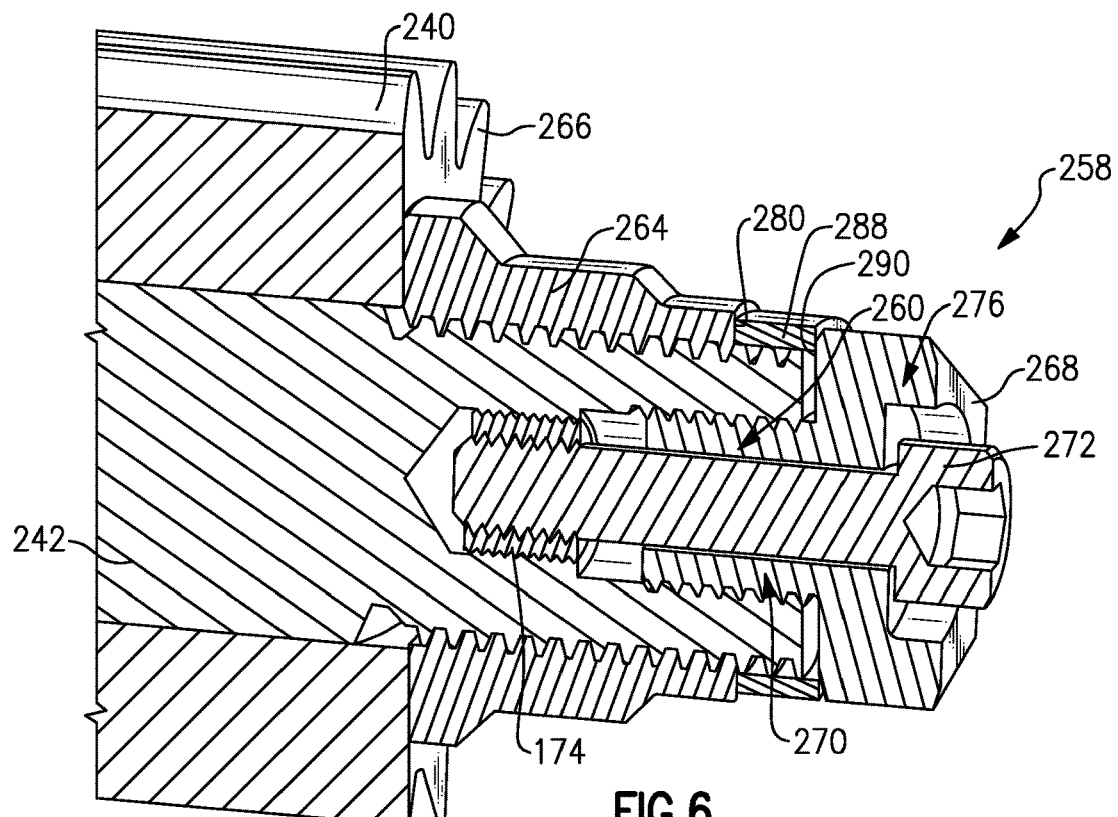
FIG. 6 illustrates a second example locking assembly.

FIG. 6 illustrates a second example locking assembly 258 substantially similar to the locking assembly 158 of FIG. 5. Instead of the cap portion 276 of the retainer 268 including a flange, a washer 288 is provided axially between the cap portion 276 and the end face 280 of the nut 264. The washer 288 is radially outward of the rotor shaft 142. The washer 288 transfers the securing force from the retainer 268 to the nut 264. The washer 288 is received against an inner face 290 of cap portion 276. As shown, all or a portion of the cap portion 276 may be hexagonally shaped.

Figure 7:
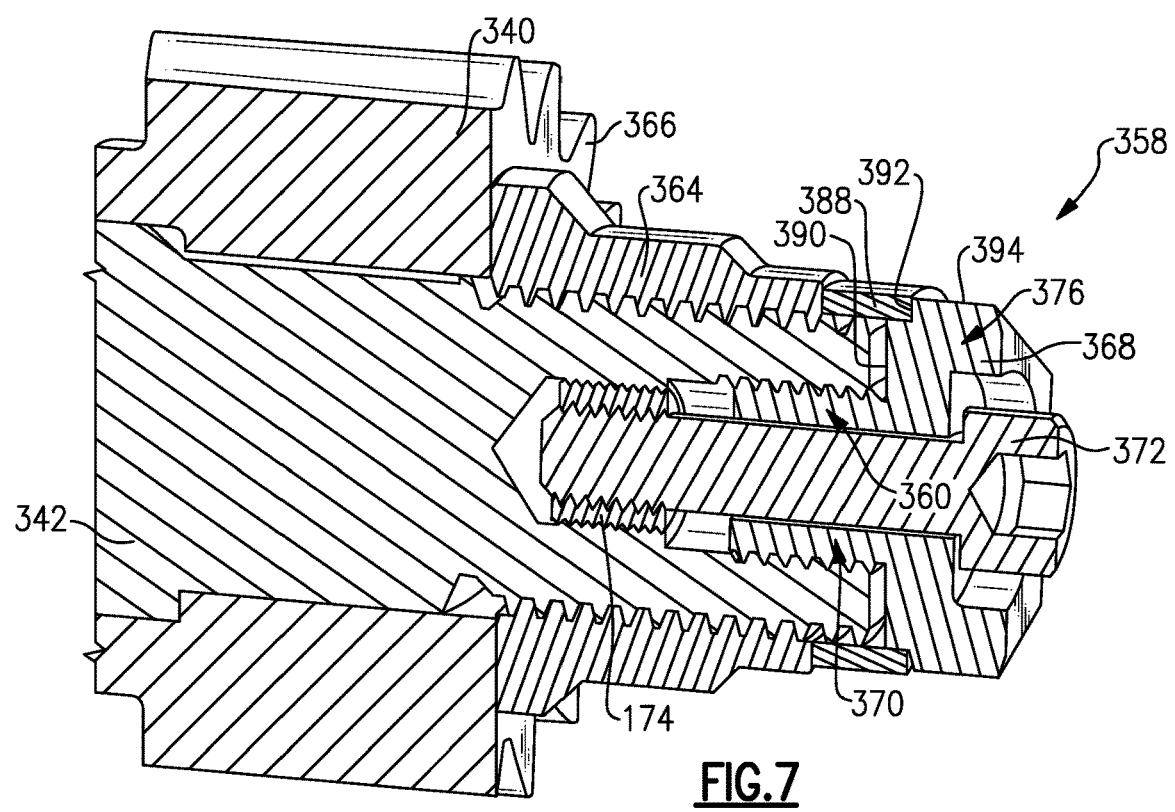
FIG. 7 illustrates a third example locking assembly.

FIG. 7 illustrates a third example locking assembly 358 substantially similar to the locking assembly 258 of FIG. 6, except the washer 388 is received in a recess 392 of the cap portion 376. The recess 392 is provided where the inner face 390 meets a radially outer face 394 in some examples.

Figure 8:
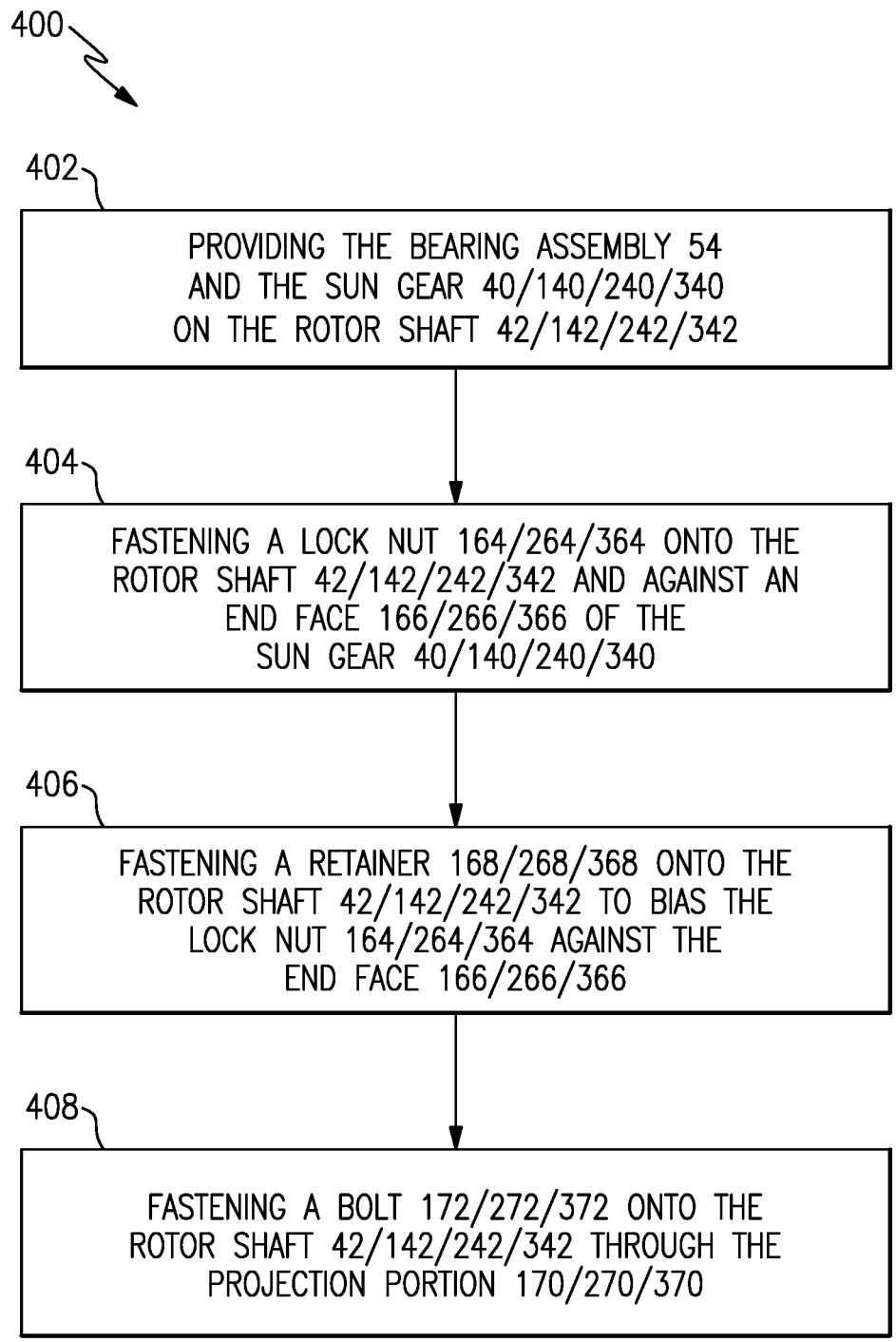
FIG. 8 illustrates a flow chart of a method for locking a bearing assembly and a sun gear onto a rotor shaft of a starter for a gas turbine engine.

FIG. 8, with reference to FIGS. 5-7, illustrates a flow chart of a method 400 for locking a bearing assembly 54 and a sun gear 40/140/240/340 onto a rotor shaft 42/142/242/342 of a starter 20 for a gas turbine engine 34.

At 402, the method 400 includes providing the bearing assembly 54 and the sun gear 40/140/240/340 on the rotor shaft 42/142/242/342.

At 404, the method 400 includes fastening a lock nut 164/264/364 onto the rotor shaft 42/142/242/342 and against an end face 166/266/366 of the sun gear 40/140/240/340.

At 406, the method 400 includes fastening a retainer 168/268/368 onto the rotor shaft 42/142/242/342 to bias the lock nut 164/264/364 against the end face 166/266/366, which may include threadedly engaging a projection portion 170/270/370 of the retainer 168/268/368 in a bore 160/260/360 of the rotor shaft 42/142/242/342.

At 408, the method 400 includes fastening a bolt 172/272/372 onto the rotor shaft 42/142/242/342 through the projection portion 170/270/370.

In some examples, the method may include providing a washer 288/388 between the retainer 168/268/368 and the lock nut 164/264/364. In some examples, step 404 may be performed with a low friction lubricant, and step 406 and step 408 may be performed dry or with the same lubricant that is used to lubricate the starter 20, including the bearing assembly 54.

The above disclosed assemblies and methods allow for clamping of the sun gear and bearing assembly using an off-the-shelf lock nut. Additional retention of the locknut is achieved through a bolted retainer. The disclosed assemblies and methods therefore result in reduced cost of components and assembly. Locking is achieved through the threading of components to the rotor shaft, without the need for custom nuts, shims, pins, or positive locking geometry components.

Although the different embodiments are illustrated as having specific components, the embodiments of this disclosure are not limited to those particular combinations. It is possible to use some of the components or features from any of the embodiments in combination with features or components from any of the other embodiments.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A starter for a gas turbine engine, comprising,
a rotor shaft rotatable about an axis and including an inner bore extending from an axial end of the rotor shaft with respect to the axis;
a sun gear on the rotor shaft;
a lock nut received against an axial end face of the sun gear and threadedly engaged with an outer diameter of the rotor shaft;
a retainer positioned to bias the lock nut against the axial end face and including a projection portion threadedly engaged with the rotor shaft in the inner bore; and
a bolt through the projection portion and threadedly engaged with the rotor shaft.

2. The starter as recited in claim 1, wherein the retainer abuts the lock nut.

3. The starter as recited in claim 1, wherein the retainer includes a projection portion extending from a cap portion, and the projection portion is threadedly engaged with the rotor shaft in the inner bore.

4. The starter as recited in claim 3, wherein the cap portion includes a flange that abuts the lock nut.

5. The starter as recited in claim 4, wherein a groove is provided between the flange and the projection portion, and an end face of the rotor shaft is received in the groove.

6. The starter as recited in claim 3, comprising:
a washer received axially between the cap portion and the lock nut.

7. The starter as recited in claim 6, wherein the washer is received in a recess in the cap portion.

8. The starter as recited in claim 1, wherein the inner bore is a counterbore including a first portion having a greater diameter than a second portion, wherein the retainer is threadedly engaged with the first portion, and the bolt is threadedly engaged with the second portion.

9. The starter as recited in claim 1, wherein the bolt is threadedly engaged with the rotor shaft through a threaded helicoil insert.

10. The starter as recited in claim 1, wherein the bolt is directly threadedly engaged with the rotor shaft.

11. The starter as recited in claim 1, comprising:
a bearing assembly received on the rotor shaft axially between a rotor and the sun gear.

12. The starter as recited in claim 1, wherein the sun gear drives a plurality of planet gears, the plurality of planet gears drive a ring gear, and the ring gear drives an output shaft.

13. The starter as recited in claim 1, wherein the lock nut is threadedly engaged with an outer diameter of the rotor shaft in a first threaded direction, and the projection portion is threadedly engaged with the rotor shaft in the inner bore in a second threaded direction opposite the first threading direction.

14. A starter for a gas turbine engine, comprising,
a rotor shaft rotatable about an axis and including an inner counterbore extending from an axial end of the rotor shaft with respect to the axis, the inner counterbore including a first portion having a greater diameter than a second portion;
a turbine rotor rotatable with the rotor shaft;
an output shaft;
a clutch;
a planetary gear system including a sun gear received on the rotor shaft and that drives a plurality of planet gears, wherein the plurality of planet gears drive a ring gear, and the ring gear drives the output shaft through the clutch;
a bearing assembly received on the rotor shaft axially between the sun gear and the turbine rotor;
a lock nut received against an axial end face of the sun gear and threadedly engaged with an outer diameter of the rotor shaft;
a retainer positioned to bias the lock nut against the axial end face, wherein the retainer includes a cap portion and a projection portion extending from the cap portion, and the projection portion is threadedly engaged with the rotor shaft in the first portion of the inner counterbore; and
a bolt through the projection portion and threadedly engaged with the rotor shaft in the second portion of the inner counterbore.

15. The method as recited in claim 14, comprising:
positioning a washer between the retainer and the lock nut.

16. A starter for a gas turbine engine, comprising,
a rotor shaft rotatable about an axis and including an inner counterbore extending from an axial end of the rotor shaft with respect to the axis, the counterbore including a first portion having a greater diameter than a second portion;
a turbine rotor rotatable with the rotor shaft;
an output shaft;
a clutch;
a planetary gear system including a sun gear received on the rotor shaft and that drives a plurality of planet gears, wherein the plurality of planet gears drive a ring gear, and the ring gear drives the output shaft through the clutch;
a bearing assembly received on the rotor shaft axially between the sun gear and the rotor;
a lock nut received against an axial end face of the sun gear and threadedly engaged with an outer diameter of the rotor shaft;
a retainer positioned to bias the nut against the axial end face, wherein the retainer includes a cap portion and a projection portion extending from the cap portion, and the projection portion is threadedly engaged with the rotor shaft in the first portion of the counterbore; and
a bolt through the projection portion and threadedly engaged with the rotor shaft in the second portion of the counterbore.

17. The starter as recited in claim 16, wherein the cap portion includes a flange that abuts the lock nut.

18. The starter as recited in claim 17, wherein a groove is provided between the flange and the projection portion, and an end face of the rotor shaft is received in the groove.

19. The starter as recited in claim 16, comprising:
a washer received axially between the cap portion and the lock nut.

20. The starter as recited in claim 19, wherein the washer is received in a recess in the cap portion.

* * * * *